(12) United States Patent
Mantha

(10) Patent No.: US 9,602,493 B2
(45) Date of Patent: Mar. 21, 2017

(54) IMPLICIT CHALLENGE AUTHENTICATION PROCESS

(71) Applicant: Cisco Technology, Inc., San Jose, CA (US)

(72) Inventor: Ravi Sankar Mantha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 14/716,074

(22) Filed: May 19, 2015

(65) Prior Publication Data

US 2016/0344716 A1 Nov. 24, 2016

(51) Int. Cl.
*H04L 29/06* (2006.01)
*H04W 12/06* (2009.01)

(52) U.S. Cl.
CPC .............. *H04L 63/08* (2013.01); *H04W 12/06* (2013.01)

(58) Field of Classification Search
CPC . H04L 63/08; H04L 63/0869; H04L 63/0884; H04W 12/06
USPC .......................................................... 726/7
See application file for complete search history.

(56) References Cited

U.S. PATENT DOCUMENTS

| 8,738,898 | B2 | 5/2014 | Herwono et al. | |
|---|---|---|---|---|
| 9,386,006 | B1* | 7/2016 | Maldaner | H04L 63/08 |
| 2002/0026573 | A1* | 2/2002 | Park | H04L 63/0428 |
| | | | | 713/155 |
| 2007/0005954 | A1* | 1/2007 | Skemer | H04L 12/2856 |
| | | | | 713/153 |
| 2008/0045214 | A1* | 2/2008 | Wen | H04L 9/3271 |
| | | | | 455/435.1 |
| 2008/0313455 | A1* | 12/2008 | Kroeselberg | H04L 63/061 |
| | | | | 713/153 |
| 2011/0216743 | A1 | 9/2011 | Bachmann et al. | |
| 2012/0144189 | A1* | 6/2012 | Zhong | H04L 63/0853 |
| | | | | 713/155 |
| 2013/0097674 | A1 | 4/2013 | Jindal et al. | |
| 2013/0290722 | A1 | 10/2013 | Kall et al. | |
| 2013/0322347 | A1 | 12/2013 | Alex et al. | |

OTHER PUBLICATIONS

Granlund, Daniel, et al. "A uniform AAA handling scheme for heterogeneous networking environments." 2009 IEEE 34th Conference on Local Computer Networks. IEEE, 2009.*

* cited by examiner

*Primary Examiner* — Syed Zaidi
(74) *Attorney, Agent, or Firm* — Edell, Shapiro & Finnan, LLC

(57) ABSTRACT

A challenge value is received at a network connected device from a first server. A secure communication channel is established with the first server based on the challenge value. A request is sent from the network connected device to a second server to authenticate with the second server, wherein sending the request comprises sending a challenge response based on the challenge value to the second server prior to receiving a challenge from the second server. A challenge decision is received from the second server at the network connected device. The network connected device authenticates with the second server in response to the challenge decision.

20 Claims, 4 Drawing Sheets

IMPLICIT CHALLENGE AUTHENTICATION PROCESS

TECHNICAL FIELD

The present disclosure relates to authenticating devices in network environments, and in particular, authenticating devices over unsecured wireless connections.

BACKGROUND

Mobile subscribers want access to the Internet at home, work, and hotspots, among other places. Mobile subscribers also expect the same quality of experience and access to the same services regardless of access location. At the same time, there is a mobile data surge that is placing strains on macro radio resources. These are some of the factors promoting expanded service offerings over multiple new unsecure, untrusted access networks, such as broadband DSL, fiber to the home, high-density events, or cable broadband networks, using technologies such as Wi-Fi® wireless networking technology.

Mobile subscribers are also seeking non-Universal Integrated Circuit Card (UICC) and/or non-Subscriber Identification Module (SIM) access to telecommunication services over untrusted Wi-Fi access points. This access enables mobile subscribers to connect their non-UICC and non-SIM card devices to avail services. Use of non-UICC and non-SIM card access to telecommunication services may increase call setup times and operator capital expenditures as mobile subscribers utilize these services more often.

DESCRIPTION OF EXAMPLE EMBODIMENTS

OVERVIEW

In one embodiment, a challenge value is received at a network connected device from a first server. A secure communication session is established with the first server based on the challenge value. A request is sent from the network connected device to a second server to authenticate with the second server, wherein sending the request comprises sending a challenge response based on the challenge value to the second server prior to receiving a challenge from the second server. A challenge decision is received from the second server at the network connected device. The network connected device authenticates with the second server in response to the challenge decision.

EXAMPLE EMBODIMENTS

Figure 1:
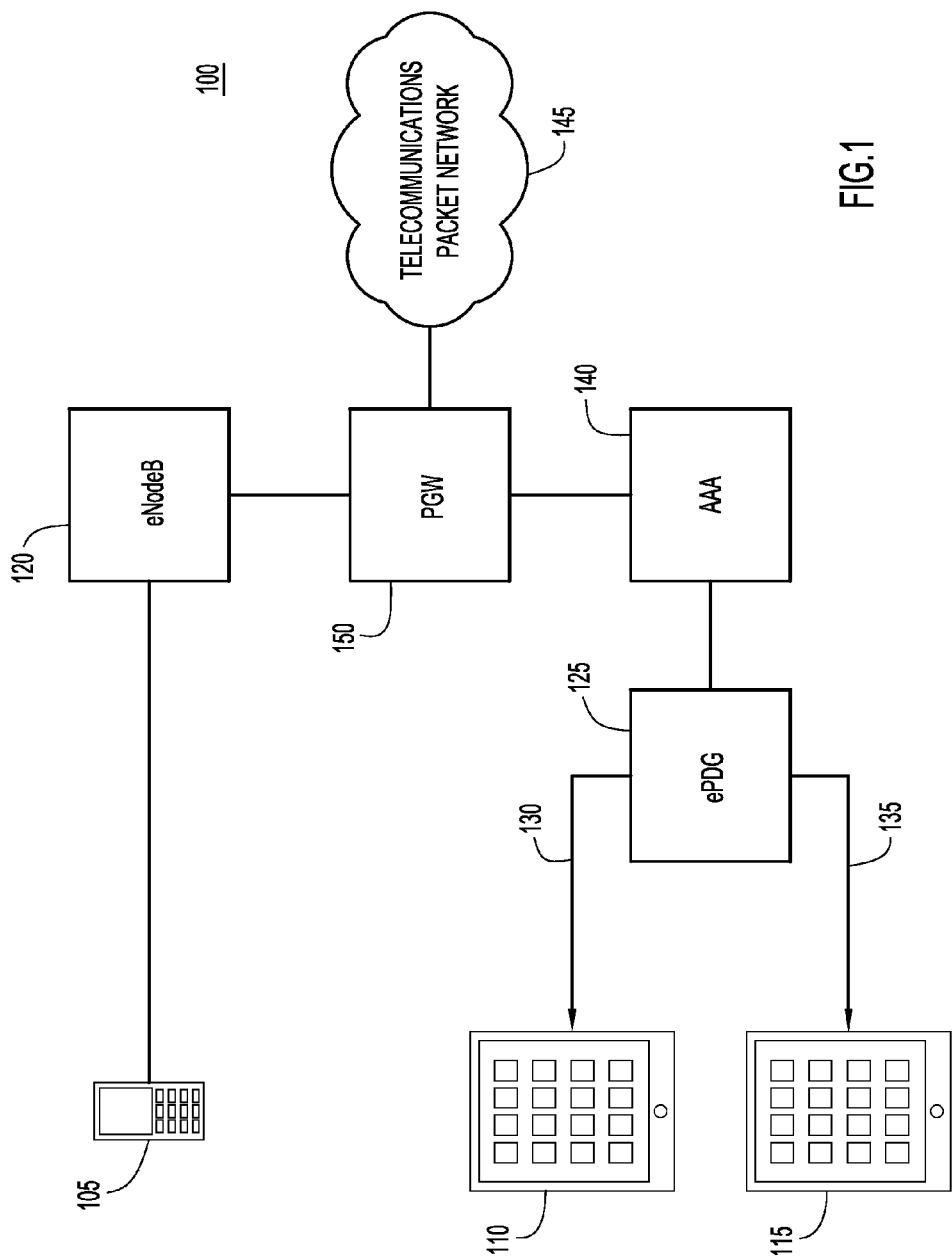
FIG. 1 is a network environment configured to provide telecommunication services to non-UICC and non-SIM card devices via unsecured wireless networks, in which user equipment may be authenticated using implicit challenge procedures, according to an example embodiment.

Depicted in FIG. 1 is an environment 100 configured to provide telecommunication services, such as a 3rd Generation Partnership Project (3GPP) environment. 3GPP environment 100 includes first user equipment 105, which is configured to access 3GPP environment 100 using a Universal Integrated Circuit Card (UICC) or a Subscriber Identification Module (SIM) card. Second user equipment 110 and third user equipment 115 are configured to access 3GPP environment 100 through an unsecured wireless network connection, such as an unsecured Wi-Fi wireless network connection.

Evolved Node B (eNodeB) 120 allows first user equipment 105 (e.g., a mobile phone, a tablet, or any other type device containing a UICC or a SIM card) to securely access the 3GPP environment 100 through the use of the UICC or SIM card. Evolved Packet Data Gateway (ePDG) 125, on the other hand, allows second user equipment 110 and third user equipment 115 (e.g., a tablet, laptop or other device lacking a UICC or a SIM card) to access the 3GPP environment 100 even though they may lack a UICC or a SIM card. According to other examples, second user equipment 110 may have a UICC or a SIM card, but access to an eNodeB is unavailable.

Second user equipment 110 and third user equipment 115 may establish secure connections with ePDG server 125, such as via Internet Security Protocol (IPSec) connections and/or tunnels. Once a connection is established with ePDG server 125, second user equipment 110 and third user equipment 115 may authenticate with Authentication, Authorization and Accounting (AAA) server 140, which defines the services and access that second user equipment 110 and third user equipment 115 can access from telecommunications packet network 145 through Packet Data Network Gateway (PGW) 150. The authentication with AAA server 140 may be performed through messages sent according to Extensible Application Protocol (EAP) Transport Layer Security (TLS) messages, EAP Tunneled Transport Layer Security messages, Microsoft™ Challenge Handshake Authentication Protocol (MSCHAP) version one or version two messages, EAP-MSCHAP version 2 messages and/or messages sent according to other authentication mechanisms. Though, for non-UICC devices mutual authentication methods such as EAP-MSCHAP version 2 have advantages over EAP-TTLS/MSCHAP version 2 as it is lightweight and Internet Key Exchange (IKE) version 2, phase 1 provides similar mechanism as EAP-TTLS phase 1 (e.g., server certificate based authentication, exchange nonces to establish secure channel for inner authentication protocol, etc.). Accordingly, service providers may prefer EAP-MSCHAP version 2 over SWu interfaces. A SWu interface is a 3GPP reference point between the user equipment and the ePDG that supports IPSec tunnels. The functionality of a SWu interface includes user equipment-initiated tunnel establishment, user data packet transmission within the IPSec tunnel, tear down of the tunnel, and support for fast update of IPSec tunnels during handover between two untrusted non-3GPP IP accesses.

According to the example of FIG. 1, once second user equipment 110 establishes a secure connection with ePDG 125, second user equipment 110 uses an implicit challenge procedure 130 to authenticate to AAA server 140, according to the techniques taught herein. As will be described in greater detail below, implicit challenge procedure 130 may comprise a challenge-response authentication procedure in which second user equipment 110 does not wait for AAA server 140 to provide it with a challenge value before sending its challenge response. Instead, second user equipment 110 provides its challenge response with, for example, its authentication request to AAA server 140. Because the challenge response is sent with the authentication request, messages that would otherwise be necessary to send the challenge value to second user equipment 110 in response to its authentication request, and messages used to send the challenge response to AAA server 140, can be avoided. According to the example of FIG. 1, second user equipment 110 may use a previously received or previously determined value, such as a nonce value received from ePDG server 125 that was used to establish the secure connection with ePDG server 125 (e.g., the "NONCEr" from the "replying" side of the exchange), as the challenge value for the authentication procedure with AAA server 140. For example, the "NONCEr" (i.e., the nonce generated by the "replying" entity in the exchange between first user equipment 110 and ePDG server 125) may be used when validating with AAA server 140.

Third user equipment 115, on the other hand, uses an explicit challenge procedure 135 to authenticate with AAA server 140. As explicit challenge procedure 135 waits to receive a challenge value from AAA server 140 in response to an authentication request, explicit challenge procedure 135 may require more network resources, taking up more time and processing cycles than implicit challenge procedure 130. Accordingly, through the use of implicit challenge procedure 130, the performance of 3GPP environment 110 may be improved, as may the capacity of AAA server 140. If capacity on AAA server 140 is increased, capital expenditures on hardware, such as that used for AAA server 140, can be decreased.

Figure 2:
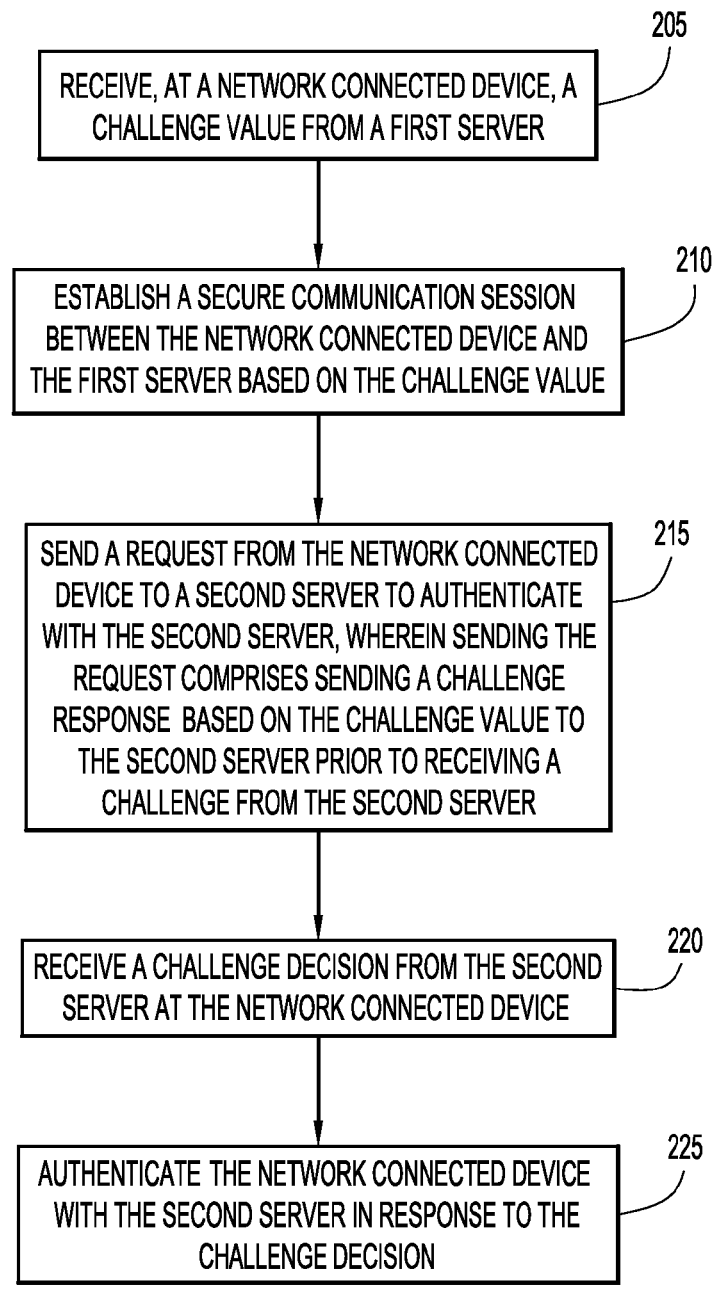
FIG. 2 is a flowchart illustrating a process for performing implicit authentication of network connected devices, according to an example embodiment.

With reference now made to FIG. 2, depicted therein is a flowchart 200, illustrating a procedure for authenticating through an implicit challenge procedure. The process begins in 205 where a challenge value is received at a first network connected device from a first server. For example, the first network connected device may be a device that lacks a UICC or a SIM card (or a device with a UICC or SIM card that cannot connect to an eNodeB) that wants to receive voice calls over an unsecured Wi-Fi connection. Accordingly, the network connected device may be user equipment, like second user equipment 110 from FIG. 1, and the first server may be an ePDG, like ePDG 150 of FIG. 1. If the network connected device is going to establish an IPSec tunnel with the first server, the challenge value may be a nonce value received from the first server as part of an IKE procedure. According to some specific examples, the challenge value and the nonce may be received as part of an IKE SA INIT exchange procedure. The nonce value may comprise a random number generated by the first server (i.e., by the ePDG). According to some example embodiments, the random number is preferably not less than 16 bytes, which ensures a high level of security. This nonce value is provided by a trusted device (i.e., the ePDG), and therefore, may also be used in the authentication procedure with a second server, such as an AAA server. In 205, a secure channel may also be established between the network connected device and the first server with the exchange of IKE SA INIT messages.

In 210, the network connected device establishes a secure communication session with the first server based on the challenge request. According to specific examples, a request may be sent from the network-connected device to the first server. Included in the request is the challenge and response value corresponding to the challenge received in 205. If the first server successfully verifies the received challenge response value, the network connected device will establish a secure communication session with the first server.

In 215, a request is sent from the network connected device to a second server in order to authenticate the network connected device with the second server. Included in the request is a challenge response based on the challenge value received in 205. For example, during an IKE exchange between 3GPP user equipment and an ePDG, the ePDG provides a nonce value to the user equipment. This nonce value is provided by a trusted device (i.e., the ePDG), and therefore, can also be used in the authentication procedure with a second server, such as an AAA server. Specifically, the first sixteen bytes of the nonce received by the network connected device during an IKE exchange with the first server may be used as an implicit challenge value in, for example, a Microsoft™ Challenge Handshake Authentication Protocol (MS-CHAP) with the second server. Therefore, when the network connected device sends an authentication request to the second server, the previously received nonce value may be used to generate the challenge response for the authentication procedure. Because the challenge response was generated without receiving an explicit challenge from the second server, the challenge response is an implicit response to a challenge. In addition to the challenge response, the challenge value (i.e., the nonce value received when authenticating with the first server, e.g., an ePDG) may also included in the Request. According to other examples, the network connected device can send the challenge response to the second server while another device, such as the first server, sends the challenge value to the second server. Because the challenge response (and optionally the challenge value) are sent with the initial authentication request, the messages that would have otherwise have been used to send the challenge value to the network connected device and receive the challenge response from the network connected device can be omitted. The omission of these messages increases the efficiency and speed of the authentication procedure, and decreases the resources necessary to carry out the authentication procedure.

In 220, a challenge decision is received by the network connected device, and in 225, the network connected device is authenticated with the second server in response to the challenge decision. For example, if the challenge decision indicates that the challenge was successful, the network connected device will be authenticated with the second server. Subsequent to the authenticating, secure communication channels may be established between the network connected device and the first and second servers. According to some examples, the first server may serve as an intermediary for communications between the network connected device and the seconds server, as will be illustrated in more detail with reference to FIG. 3 below.

In other words, the process of flowchart 200, when applied to an example embodiment like the EPC environment 100 of FIG. 1, can be described as providing the following functionality:

1. An ePDG sends nonces during an IKE INIT Exchange. The nonces comprise a minimum of 16 random number bytes generated on the ePDG.
2. User equipment can use the first 16 bytes of the random number received from ePDG as a challenge for MSC-HAP version 2, and can send the "challenge" and its corresponding "response" built on the challenge and password, in one message to the ePDG as an EAP response.

3. The ePDG forwards the EAP response received from the user equipment to the AAA server, which includes the challenge, in the form of a Diameter EAP Request (DER). The inclusion of the challenge by the ePDG will help the AAA server to cross check that the challenge sent by the user equipment is indeed the same as the challenge generated on ePDG.
4. The AAA server can match the challenge received from the ePDG and compare it against the challenge in the EAP response. If the challenges match, the user equipment and the AAA server proceed with password validation by validating the challenge response.
5. Because the ePDG and the AAA-server are in a service provider's trusted network, and because the user equipment is not generating the NONCEr, using the NONCEr from the ePDG authentication for the AAA server authentication should not pose any security vulnerability such as replay attack vulnerability.

Accordingly, the process of FIG. 2 presents an implicit challenge mechanism that can be used with the EAP-MSCHAPv2 authentication protocol. Furthermore, when used by non-UICC devices over the logical interface towards user equipment (i.e., SWu interface) to connect to ePDG and the EPC Core, the process of FIG. 2 may optimize message exchanges between user equipment and AAA servers (via ePDGs). Use of the NONCEr sent in IKE_SA_INIT response serves as an "implicit" challenge during EAP-MSCHAPv2 authentication protocol exchanges. The process of FIG. 2 also provide a method for forwarding challenges generated by an IPSec server (e.g., the ePDG) to AAA/EAP servers (via, e.g., the SWm interface).

Implicit challenge processes, like the one illustrated in FIG. 2, may reduce in-call setup time resulting in a better end user experience. Implicit challenge processes, like the one illustrated in FIG. 2, may also reduce operator capital expenditure due to capacity savings in ePDG and AAA-server nodes.

Figure 3:
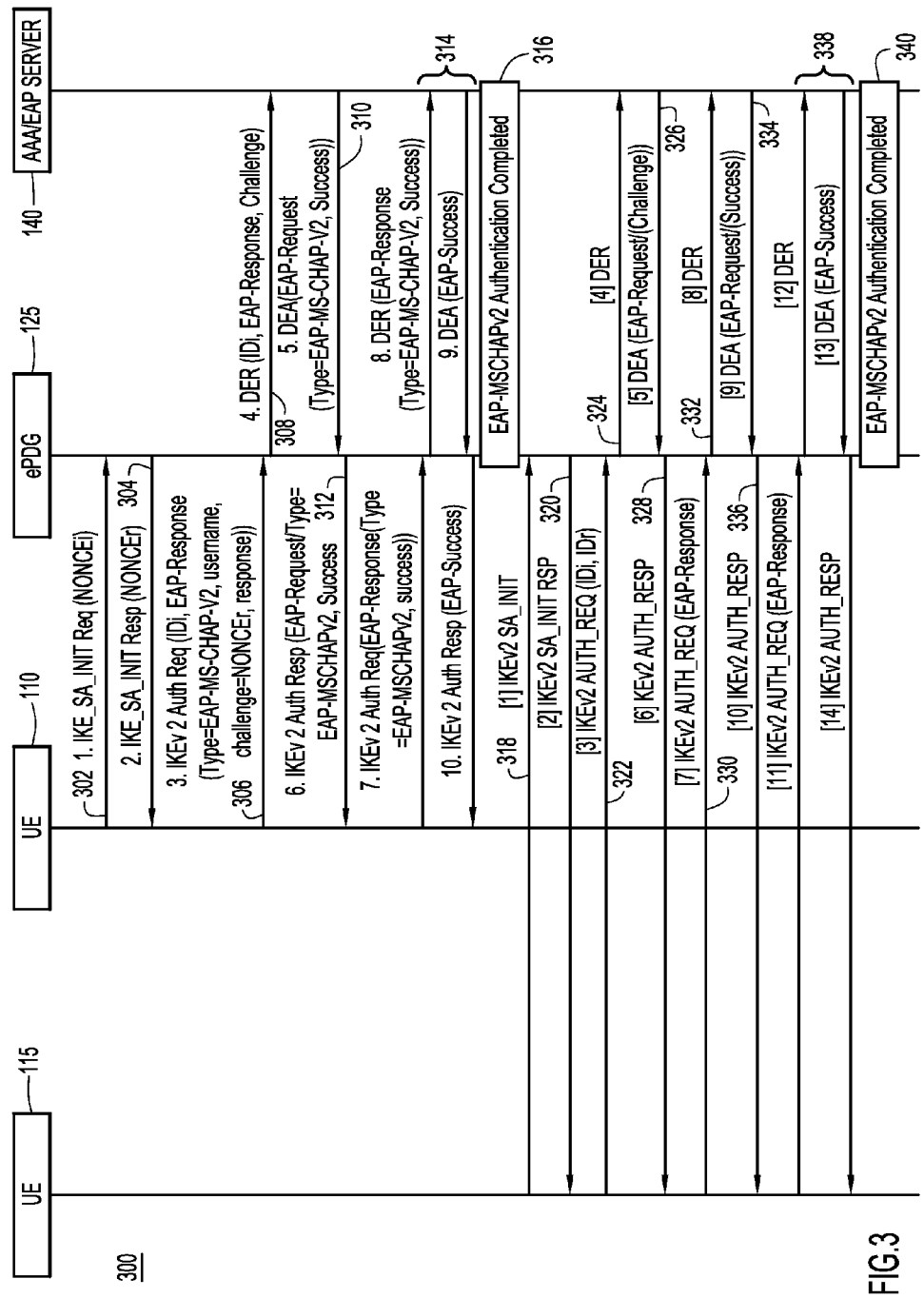
FIG. 3 is an exchange diagram illustrating message exchanges for performing implicit and explicit authentication of network connected devices, according to an example embodiment.

With reference now made to FIG. 3, depicted therein is a process diagram 300 illustrating the messages exchanged between a first user equipment network connected device 110, a first server such as an ePDG server 125, and a second server such as an AAA server 140 according to an implicit authentication process. Also illustrated are the messages exchanged between a second user equipment network connected device 115. The exchange begins with the messages for the implicit exchange performed by first user equipment 110.

First user equipment 110 begins the process of authenticating to a telecommunications network, such as 3GPP network 100 of FIG. 1, by sending request message 302. According to the example of FIG. 3, message 302 is the first of a pair of IKE SA INIT messages that exchange and negotiate the cryptographic algorithms, that exchange nonces and that perform a Diffie-Hellman exchange, though other example embodiments may implement other forms of message exchanges. Message 304, sent by ePDG 125, similarly includes a nonce value, NONCEr, that is used to perform the Diffie-Hellman exchange. Upon exchange of messages 302 and 304, a secure connection is established between first user equipment 110 and ePDG 125.

Next, first user equipment 110 sends IKE version 2 authentication request message 306 to AAA server 140 via ePDG 125. When utilizing an explicit exchange, as will be described in greater detail with reference to second user equipment 115, an IKE version 2 request message would simply send information necessary to initiate an authentication procedure with AAA server 140, such as an identifier for user equipment 110, and an indication of the type of authentication to be performed. Yet, because first user equipment 110 is performing an implicit challenge procedure, it is assumed that the NONCEr provided to first user equipment 110 from ePDG 125 will act as the challenge value. Accordingly, message 306 also includes a challenge response generated from the "assumed" challenge value, the NONCEr. Message 306 may also include the NONCEr. According to other examples, the NONCEr may be omitted from message 306 as message 306 is being sent via ePDG 125, the original source of NONCEr. The information in message 306 is forwarded to AAA server 140 through DER 308.

Because the challenge response was included in message 306, and forwarded to AAA server 140 through message 308, AAA server 140 can immediately respond with an indication of whether or not the challenge of first user equipment 110 was successful. According to the example of FIG. 3, the challenge was successful, and AAA server 140 responds to ePDG 125 with Diameter EAP Acknowledgment (DEA) 310. The content of DEA message 310 is forwarded to first user equipment 110 through IKE version 2 authentication response message 312. First user equipment 110, ePDG 125, AAA server 140 then complete the authentication of first user equipment 110 through messages 314, and the authentication completes at 316.

Exchange 300 continues with the authentication of second user equipment 115, which utilizes an explicit authentication process to authenticate to AAA server 140. The process begins with messages 318 and 320, which correspond to message 302 and 304 from the process of first user equipment 110, respectively. The exchange continues with message 322, which unlike message 306, initiates an explicit authentication procedure. Because message 322 is not part of an implicit authentication procedure, message 322 only includes identifying information, and it does not include a challenge response or a challenge value. The identifying information in message 322 is forwarded to AAA server 140 through DER message 324. AAA server 140 responds to DER message 324 with DEA message 326. Included in DEA message 326 is a challenge value that second user equipment 115 will use to generate its challenge response. Accordingly, the authentication of second user equipment 115 is considered "explicit" as AAA server 140 explicitly provides the challenge value to second user equipment 115. The challenge value is forwarded to second user equipment 115 by IKE version 2 authentication response message 328.

Now in possession of the challenge value, second user equipment 115 generates a challenge response using the challenge value, and transmits the challenge response to AAA server 140 through IKE version 2 Request message 330. The challenge response is forwarded from ePDG 125 to AAA server 140 through DER message. 332. AAA server 140 evaluates the challenge response, and replies with DEA message 334, in this example, replying that the challenge was successful. The successful challenge is transmitted to second user equipment 115 through IKE version 2 authentication response message 336.

Upon receipt of message 336, second user equipment 115, ePDG 125 and AAA server 140 complete the authentication process through messages 338, which are analogous to messages 314, and the authentication completes at 340.

The difference between the implicit authentication performed by first user equipment 110 and the explicit authentication performed by second user equipment 115 is highlighted by messages 324, 326, 328 and 330. These messages are sent in the explicit authentication process, but there are no analogous messages sent in the implicit authentication process. Accordingly, there may be significant time and resource gains achieved through the use of the implicit challenge described above, particularly when compared with an explicit challenge authentication process.

Figure 4:
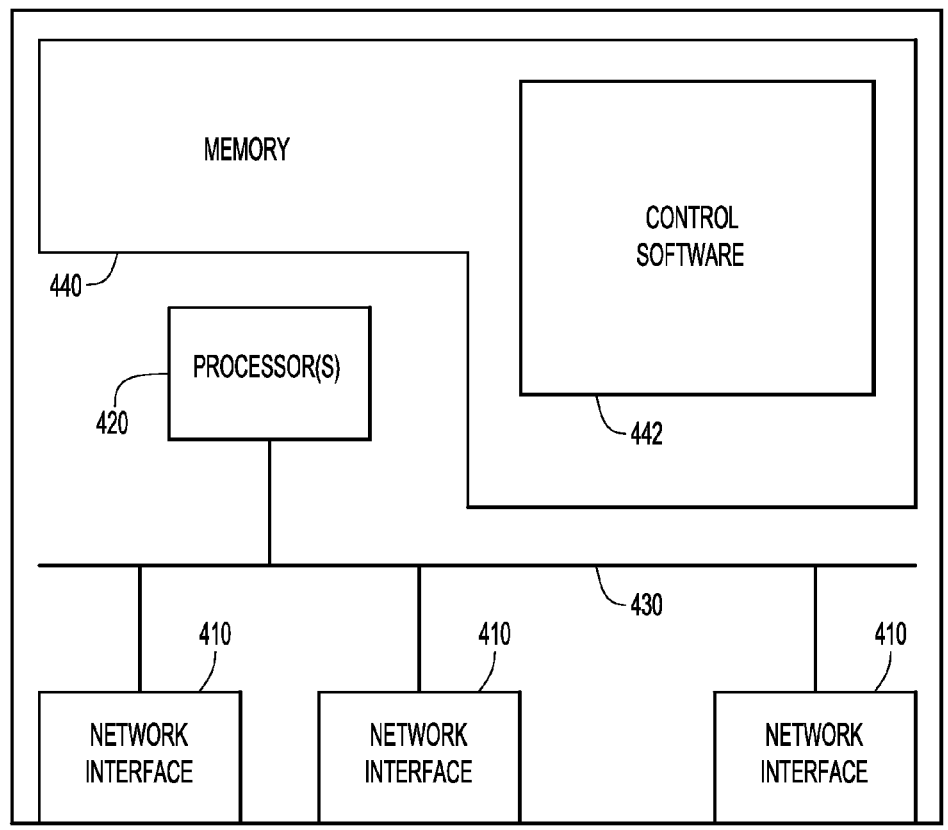
FIG. 4 is a block diagram of a device configured to perform implicit authentication of network connected devices, according to an example embodiment.

With reference now made to FIG. 4, an example block diagram is shown of a device 400, where device 400 may be any one of a user equipment device or a server, as described above with reference to FIGS. 1-3 above. Accordingly, device 400 is configured to perform the techniques described herein. Device 400 includes network interfaces 410 which may be used to connect to other devices. Accordingly, network interfaces 410 may be embodied as wired or wireless interfaces for use with UICC devices, SIM card devices, non-UICC devices and/or non-SIM card devices. One or more processors 420 are provided to coordinate and control device 400. The processor 420 is, for example, one or more microprocessors or microcontrollers, and it communicates with the network interfaces 410 via bus 430. Memory 440 stores software instructions 442 which may be executed by the processor 420. For example, control software 442 for device 400 includes instructions for performing the implicit and explicit authentication processes, as described above with reference to FIGS. 1-3. In other words, memory 440 includes instructions for device 400 to carry out the operations described above in connection with FIGS. 1-3.

Memory 440 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 440 may be or include one or more tangible (non-transitory) computer readable storage media (e.g., a memory device) encoded with software comprising computer executable instructions. When the instructions of the control software 442 is executed (by the processor 420), the processor is operable to perform the operations described herein in connection with FIGS. 1-3.

In summary, described herein are processes for providing implicit authentication of network connected devices. According to the processes taught herein a challenge value is received at a network connected device from a first server. A secure communication session is established with the first server based on the challenge value. A request is sent from the network connected device to a second server to authenticate with the second server, wherein sending the request comprises sending a challenge response based on the challenge value to the second server prior to receiving a challenge from the second server. A challenge decision is received from the second server at the network connected device. The network connected device authenticates with the second server in response to the challenge decision.

Also described herein is an apparatus configured to provide implicit authentication of network connected devices. The apparatus includes a network interface unit configured to send and receive traffic over a network, and a processor is configured to receive a challenge value over the network interface from a first server. The processor establishes a secure communication session with the first server based on the challenge value. The processor sends a request via the network interface to a second server to establish a secure communication session with the second server, wherein sending the request comprises sending a challenge response based on the challenge value to the second server prior to receiving a challenge from the second server. A challenge decision is received via the communication interface, and the processor authenticates with the second server in response to the challenge decision.

Finally, a non-transitory computer readable storage media are described herein, that stores or is encoded with instructions which when executed by a processor, cause the processor to receive a challenge value from a first server. The instructions further cause the processor to establish a secure communication session with the first server based on the challenge value. The instructions further cause the processor to send a request to a second server to authenticate with the second server, wherein sending the request comprises sending a challenge response based on the challenge value to the second server prior to receiving a challenge from the second server. A challenge decision is received, and the instructions cause the processor to authenticate with the second server in response to the challenge decision.

The above description is intended by way of example only. Various modifications and structural changes may be made therein without departing from the scope of the concepts described herein and within the scope and range of equivalents of the claims.

What is claimed is:

1. A method comprising:
   receiving, at a network connected device, a challenge value from a first server;
   establishing a secure communication session with the first server based on the challenge value;
   sending a request from the network connected device to a second server to authenticate with the second server, wherein sending the request comprises sending a challenge response based on the challenge value to the second server prior to receiving a challenge from the second server;
   receiving a challenge decision from the second server at the network connected device; and
   authenticating the network connected device with the second server in response to the challenge decision.

2. The method of claim 1, further comprising establishing a secure communication session with the second server, wherein the network connected device establishes the secure communication session with the second server without using a Universal Integrated Circuit Card.

3. The method of claim 2, wherein the establishing the secure communication session with the second server comprises establishing a communication session with the second server via the first server for voice communications over an Internet Protocol network.

4. The method of claim 3, wherein establishing the communication session for voice communications over the Internet Protocol network comprises establishing the communication session through an untrusted wireless network.

5. The method of claim 1, wherein receiving the challenge value from the first server comprises receiving a nonce value as part of a challenge-response procedure with the first server.

6. The method of claim 1, wherein the second server comprises an Authentication, Authorization and Accounting server.

7. The method of claim 6, wherein the first server comprises an Evolved Packet Data Gateway server.

8. The method of claim 1, wherein sending the request from the network connected device to the second server to authenticate with the second server comprises sending the challenge value from the network connected device to the second server.

9. The method of claim 8, wherein sending the challenge value from the network connected device to the second server comprises sending the challenge value in a same message as the challenge response.

10. The method of claim 1, further comprising sending the challenge response from the first server to the second server.

11. The method of claim 1, wherein sending a request from the network connected device to a second server comprises sending an Internet Key Exchange Authorization Request message.

12. The method of claim 1, wherein receiving the challenge decision comprises receiving at least one of an Internet Key Exchange Authorization Response Message or a Diameter Extensible Application Protocol Acknowledgment message.

13. An apparatus comprising:
a network interface unit configured to send and receive traffic over a network, and a processor, wherein the processor is configured to:
receive, via the network interface, a challenge value from a first server;
establish a secure communication session with the first server based on the challenge value;
send a request via the network interface to a second server to authenticate with the second server, wherein sending the request comprises sending a challenge response based on the challenge value to the second server prior to receiving a challenge from the second server;
receive via the network interface a challenge decision from the second server, and
authenticate with the second server in response to the challenge decision.

14. The apparatus of claim 13, wherein the processor is further configured to establish a secure communication session with the second server, wherein the processor establishes the secure communication session with the second server without using a Universal Integrated Circuit Card.

15. The apparatus of claim 14, wherein the processor is further configured to establish the secure communication session with the second server by establishing a communication session with the first server for voice communications over an Internet Protocol network.

16. The apparatus of claim 15, wherein the processor is further configured to establish the communication session for voice communications over the Internet Protocol network by establishing the communication session through an untrusted wireless network.

17. The apparatus of claim 14, wherein the processor is further configured to receive the challenge value from the first server by receiving a nonce value as part of a challenge-response procedure with the first server.

18. A non-transitory computer readable medium encoded with instructions, wherein the instructions, when executed by a processor, cause the processor to:
receive, via a network interface, a challenge value from a first server;
establish a secure communication session with the first server based on the challenge value;
send a request over the network to a second server to authenticate with the second server, wherein sending the request comprises sending a challenge response based on the challenge value to the second server prior to receiving a challenge from the second server;
receive over the network a challenge decision from the second server, and
authenticate with the second server in response to the challenge decision.

19. The non-transitory computer readable medium of claim 18, wherein the instructions further cause the processor to establish a secure communication session with the second server, wherein the processor establishes the secure communication session with the second server without using a Universal Integrated Circuit Card.

20. The non-transitory computer readable medium of claim 19, wherein the instructions that cause the processor to establish the secure communication session with the second server comprise instructions that cause the processor to establish a communication session with the first server for voice communications over an Internet Protocol network.

* * * * *